R. G. KENNEDY.
SPOON HOLDER.
APPLICATION FILED MAR. 24, 1916.

1,258,015.

Patented Mar. 5, 1918.

Witness
C. R. Bealle
W. H. Davidson

Inventor
R. G. Kennedy
By A. Randolph Jr. Attorney

UNITED STATES PATENT OFFICE.

RODNEY G. KENNEDY, OF CADILLAC, MICHIGAN.

SPOON-HOLDER.

1,258,015.   Specification of Letters Patent.   Patented Mar. 5, 1918.

Application filed March 24, 1916. Serial No. 86,399.

*To all whom it may concern:*

Be it known that I, RODNEY G. KENNEDY, a citizen of the United States, residing at Cadillac, in the county of Wexford and State of Michigan, have invented certain new and useful Improvements in Spoon-Holders; and I do hereby declare the following to be a full, clear, and exact description of the invention, such as will enable others skilled in the art to which it appertains to make and use the same.

This invention relates to new and useful improvements in a spoon holder and one of its objects is the provision of a device of this character, which shall be simple, durable and efficient, and which may be manufactured and sold at a comparatively small cost.

Another object of this invention is to provide a frame, having its ends bent to engage the sides of a cooking receptacle for supporting a receptacle to receive a spoon, which is being used in stirring the contents of the cooking receptacle, eliminating the necessity of carrying the spoon to a table or placing it upon the stove.

A further object of this invention is to provide a frame constructed from a single piece of wire, which is bent to form a loop for receiving and supporting the receptacle.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1:
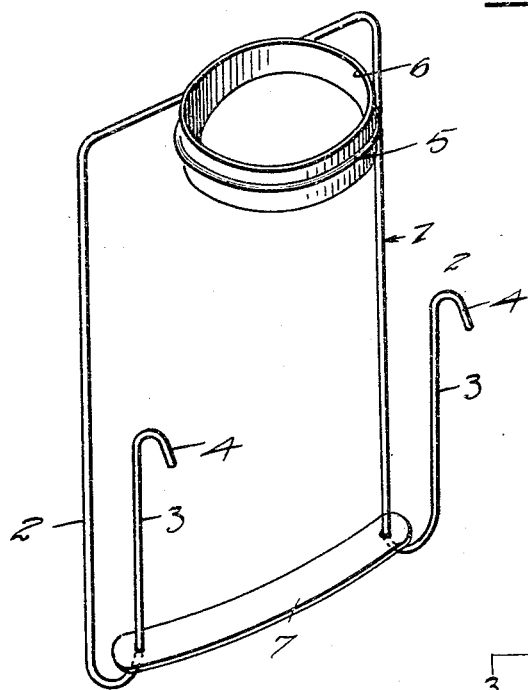
Figure 2:
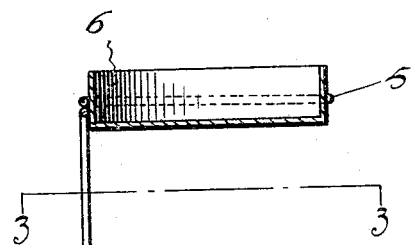
Figure 3:
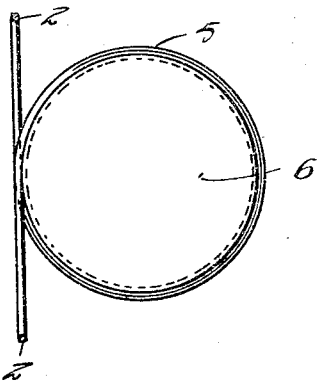
Figure 3:
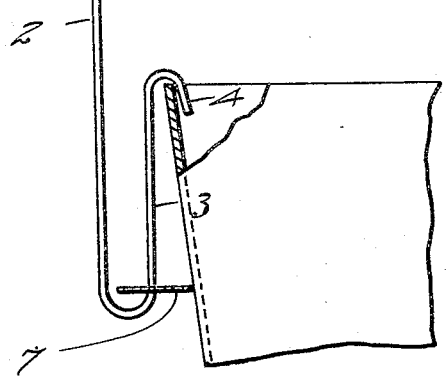

Figure 1 is a perspective view of a spoon holder, constructed in accordance with my invention, Fig. 2 is a vertical sectional view of the same and illustrating it applied to a receptacle, and Fig. 3 is a transverse sectional view taken on the line 3—3 of Fig. 2.

Referring in detail to the drawing, the numeral 1 indicates a substantially U-shaped frame, having its arm portions 2 bent back upon themselves as illustrated at 3 to provide attaching arms. The ends of the attaching arms are bent to form hooks 4, which are adapted to hook over the edges of a cooking receptacle (not shown).

The U-shaped frame 1 is bent intermediate its ends to provide a loop 5 for receiving and supporting a receptacle 6 directly over the cooking receptacle. A reinforcing strip 7 is slidably secured on the arm portions 2 of the U-shaped frame, whereby the strip 7 may be moved to any desired point upon the U-shaped frame to prevent it from becoming spread or out of shape.

In operation the hooks 4 are placed over the edge of the cooking receptacle and the supporting arms 3 will engage the walls of the cooking receptacle and support the U-shaped frame 1 vertically thereof, thus providing an efficient rack for a spoon, whereby a person may readily place the spoon within the receptacle 6 after finishing the process of stirring the ingredients which are being cooked within the cooking receptacle, and which will prevent the drippings from the spoon from falling on the stove or floor.

While I have shown and described the preferred embodiment of my invention, it will be understood that minor changes in construction, combination and arrangement of parts may be made without departing from the spirit and scope of the invention as claimed.

Having thus described my invention, what I claim is:—

A spoon holder comprising a substantially U-shaped frame having its leg portions bent upon themselves in spaced relation to form attaching arms adapted to be disposed against the wall of a receptacle, said attaching arms having their free ends bent to form hooks to engage the periphery of the receptacle for holding the arms in close proximity to the wall of the receptacle, said frame having its web portion bent to form an elastic loop, a circular receptacle carried by said loop and disposed over the first named receptacle, and a reinforcing member slidable upon the leg portions of the frame and upon the attaching arms adapted to prevent the leg portions from spreading or becoming out of shape and when positioned upon the attaching arms adapted to prevent the same from spreading and also engage the wall of the first named receptacle to aid in supporting the frame.

In testimony whereof I affix my signature in presence of two witnesses.

RODNEY G. KENNEDY.

Witnesses:
MARY E. SMITH,
ALBERT M. WATSON.

Copies of this patent may be obtained for five cents each, by addressing the "Commissioner of Patents. Washington, D. C."